United States Patent
Lin et al.

(10) Patent No.: US 7,671,554 B2
(45) Date of Patent: Mar. 2, 2010

(54) MOTOR DRIVING SYSTEM

(75) Inventors: Chia-Chang Lin, Taipei (TW); Chih-Hsun Lin, Taipei (TW)

(73) Assignee: Primax Electronics, Ltd., Taipei (TW)

( * ) Notice: Subject to any disclaimer, the term of this patent is extended or adjusted under 35 U.S.C. 154(b) by 308 days.

(21) Appl. No.: 11/958,987

(22) Filed: Dec. 18, 2007

(65) Prior Publication Data

US 2009/0108787 A1   Apr. 30, 2009

(30) Foreign Application Priority Data

Oct. 26, 2007   (TW) .............................. 96140186 A

(51) Int. Cl.
*H02P 6/00* (2006.01)
(52) U.S. Cl. .................... 318/466; 318/562; 318/14; 388/937
(58) Field of Classification Search ................ 318/266, 318/466, 560, 561, 562, 14; 388/937
See application file for complete search history.

(56) References Cited

U.S. PATENT DOCUMENTS

2006/0273135 A1* 12/2006 Beetel ...................... 227/175.1
2009/0206547 A1*  8/2009 Tokita et al. ................ 271/264

* cited by examiner

*Primary Examiner*—Paul Ip
(74) *Attorney, Agent, or Firm*—Kirton & McConkie; Evan R. Witt

(57) ABSTRACT

The present invention relates to a motor driving system. The motor driving system includes a motor, a transmission member, a follower member, a position-detecting light emitter, a position-detecting light receiver, and a positioning-status sensing element. The positioning-status sensing element includes a plurality of notches or openings. The positioning-status sensing element is moved between the position-detecting light emitter and the position-detecting light receiver such that a light beam emitted from the position-detecting light emitter is successively penetrated through the notches or openings to be received by the position-detecting light receiver. According to the light-receiving status of the position-detecting light receiver, the speed of the motor is reduced.

3 Claims, 3 Drawing Sheets

US 7,671,554 B2

MOTOR DRIVING SYSTEM

FIELD OF THE INVENTION

The present invention relates to a motor driving system, and more particularly to a motor driving system for positioning a motor.

BACKGROUND OF THE INVENTION

Motors are widely used in electronic and mechanical industries for converting electrical energy into mechanical energy. Generally, motors are classified into three types, for example DC motors, AC motors and stepper motors.

Stepper motors have precise positioning capability but generate relatively low power output. As a result, stepper motors often comply with the equipment requiring high positioning precision. For example, stepper motors are used to control zoom lenses of cameras. In comparison with stepper motors, DC motors and AC motors can provide more power output but lower positioning precision.

In other word, if high power output is required, DC motors and AC motors are usually used. Take electric punches for office use for example. For providing sufficient power to drive the punching knife of the electric punch, DC motors, universal motors or synchronous motors are generally used. When the procedure of punching through holes is terminated and the power provided by the motor is instantly interrupted (i.e. "a motor brake"), the punching knife needs to be precisely located at the return position. If the punching knife is deviated from the return position, the punching knife possibly blocks the insertion area of the electric punch and thus the documents fail to be placed in the insertion area.

Since the speed of the motor is not instantly reduced to zero when the power of the motor is eliminated, the punching knife may fail to be precisely located at the return position. In other words, due to an inertia swing phenomenon, the punching knife fails to stay at the return position and the punching knife is not be precisely located at the return position when the power of the motor is eliminated.

Furthermore, if high power output and high positioning precision are required, AC motors (e.g. induction motors) are usually used. The induction motors, however, may generate an inrush current during the motor brake is carried out. As a consequence, the components of the induction motors are readily damaged by the inrush current.

Therefore, there is a need of providing an improved motor driving system for providing high power output and high positioning precision to position a motor without the generation of a considerable inrush current.

SUMMARY OF THE INVENTION

It is an object of the present invention to provide a motor driving system for providing high power output and high positioning precision to position a motor.

In accordance with an aspect of the present invention, there is provided a motor driving system for control movement of a follower member. The motor driving system includes a motor, a transmission member, a position-detecting light emitter, a return light emitter, a position-detecting light receiver, a return light receiver and a positioning-status sensing element. The motor provides a working mechanical energy E required to control movement of the follower member. The transmission member is coupled to the motor and the follower member and driven by the motor to transmit the follower member to move. The position-detecting light emitter and the return light emitter generate a first light beam and a second light beam, respectively. The position-detecting light receiver and the return light receiver receive the first light beam and the second light beam, respectively. The positioning-status sensing element is disposed on the transmission member and includes a front end, a rear end and a plurality of notches or openings between the first end and the rear end. The positioning-status sensing element is moved between the position-detecting light emitter and the position-detecting light receiver such that a light beam emitted from the position-detecting light emitter is successively penetrated through the notches or openings to be received by the position-detecting light receiver. When the notch or opening nearest to the front end of the positioning-status sensing element enters the region between the position-detecting light emitter and the position-detecting light receiver, the working mechanical energy E provided by the motor is decreased to a first mechanical energy E1 so as to reduce the speed of the transmission member. When the notch or opening nearest to the rear end of the positioning-status sensing element enters the region between the position-detecting light emitter and the position-detecting light receiver, the working mechanical energy E provided by the motor is decreased to a final mechanical energy En, where the first mechanical energy E1 is greater than the final mechanical energy En.

Preferably, the motor is a universal motor, a DC motor, a synchronous motor or an induction motor.

In an embodiment, the follower member is a punching knife.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
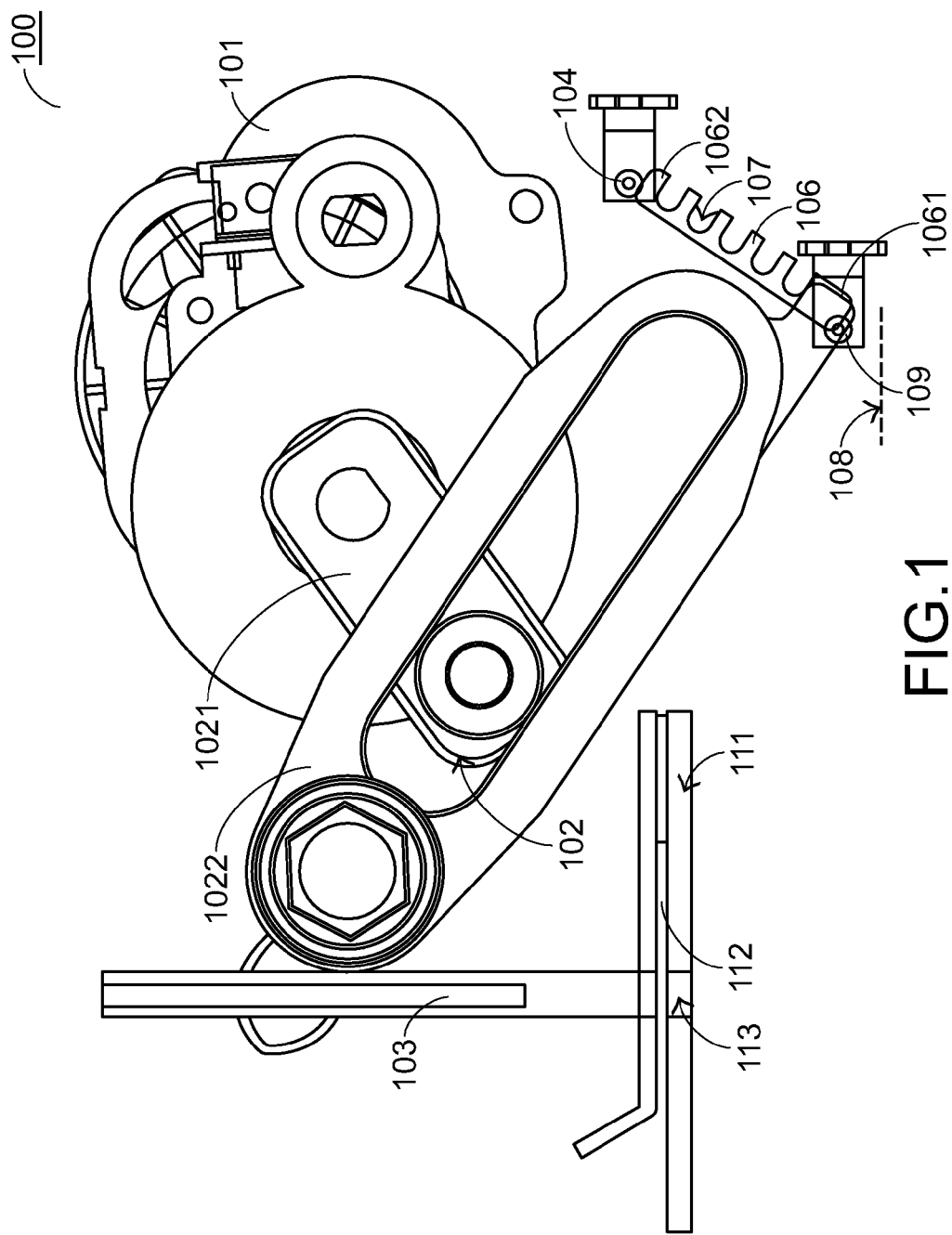
FIG. 1 is a schematic perspective view of a motor driving system for use with an electric punch according to a first preferred embodiment of the present invention.
Figure 2:
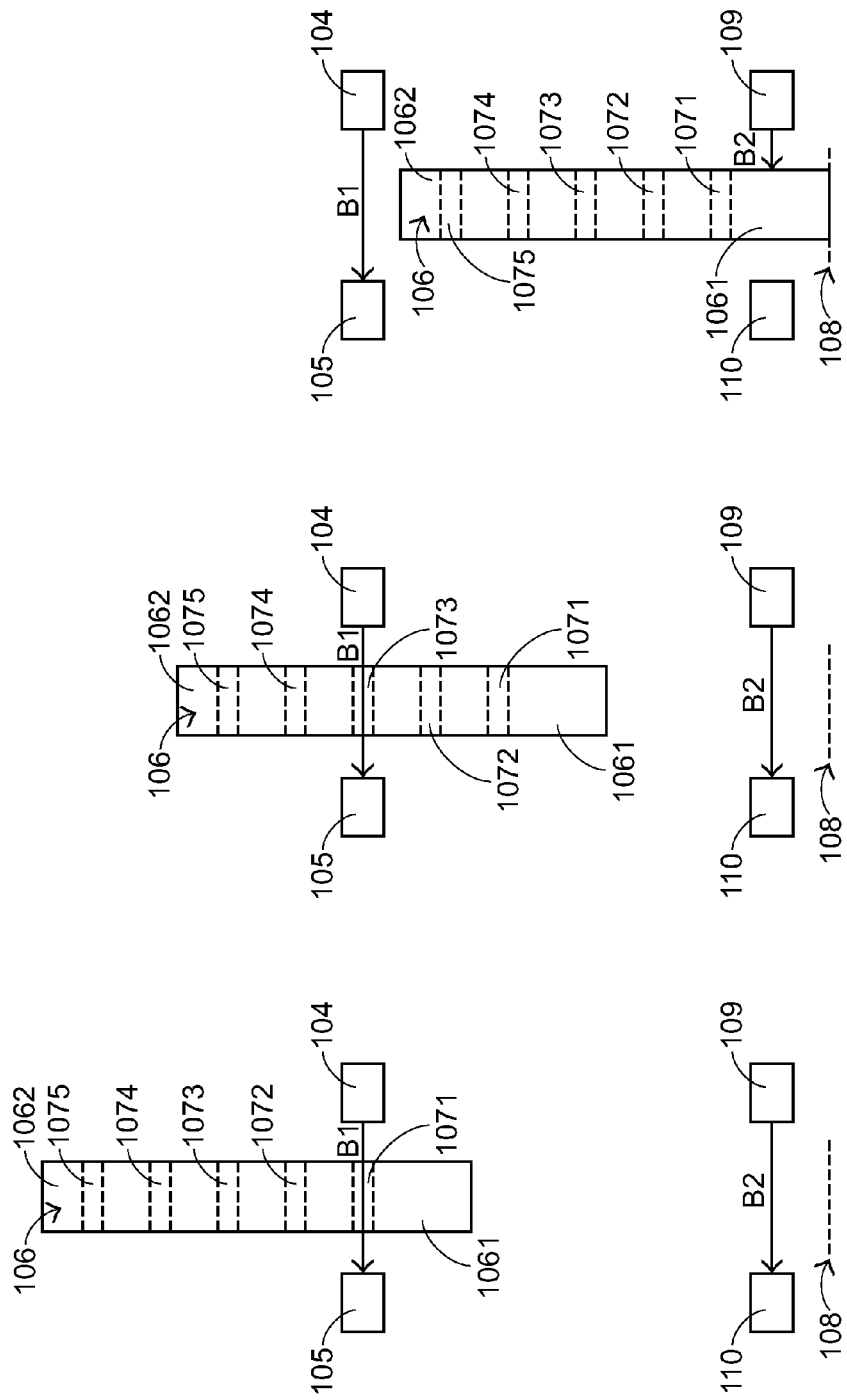
FIGS. 2(a), 2(b) and 2(c) are schematic diagrams illustrating operations of an exemplary positioning-status sensing element according to the present invention.

Referring to FIG. 1, a schematic perspective view of a motor driving system for use with an electric punch according to a first preferred embodiment of the present invention is illustrated. As shown in FIG. 1, the electric punch 100 principally includes a motor 101, a transmission member 102, a punching knife 103, a position-detecting light emitter 104, a position-detecting light receiver 105 (as shown in FIG. 2), a positioning-status sensing element 106, a platform 111 for placing documents thereon, a return light emitter 109 and a return light receiver 110 (as shown in FIG. 2). The positioning-status sensing element 106 has a front end 1061 and a rear end 1062. The positioning-status sensing element 106 further includes a plurality of notches 107, which are arranged between the front end 1061 and the rear end 1062.

In the initial status of the electric punch 100, the punching knife 103 is disposed on the platform 111, wherein the gap between the punching knife 103 and the platform 111 is sufficient to introduce documents therebetween. Under this circumstance, the location of the punching knife 103 is referred as an initial position.

Hereinafter, a process of using the electric punch 100 to punch through holes will be illustrated as follows. First of all, the document to be punched (not shown) is inserted into an insertion area 112 of the platform 111. Next, the electric punch 100 is powered on. Meanwhile, the transmission arm 1021 and the transmission cam 1022 of the transmission member 102 are driven by the motor 101, so that the punching knife 103 which is coupled to a terminal of the transmission cam 1022 is linearly moved with rotary motion of the transmission member 102. The platform 111 is disposed under the punching knife 103 and has a guide hole 113 aligned with the punching knife 103. Afterwards, the punching knife 103 is moved downwardly to the guide hole 113, thereby creating a through hole in the document.

As previously described, if the punching knife 103 stays in the insertion area 112 due to an inertia swing phenomenon after the punching operation is terminated, the insertion area 112 is ready hindered by the punching knife 103. For preventing the punching knife 103 from staying in the insertion area 112, the punching knife 103 needs to return to its initial position. In accordance with a key feature of the present invention, the positioning-status sensing element 106 of the motor drive system is advantageous for facilitating positioning the punching knife 103 in the initial position.

Please refer to FIG. 1 again. The punching knife 103 is coupled to a terminal of the transmission cam 1022. The other terminal of the transmission cam 1022 is coupled to the positioning-status sensing element 106. When the transmission arm 1021 and the transmission cam 1022 of the transmission member 102 are driven by the motor 101, the punching knife 103 is linearly moved with the rotary motion of the transmission member 102. At the same time, the positioning-status sensing element 106 which is coupled to the other terminal of the transmission cam 1022 is moved with the rotary motion of the transmission member 102. In other words, the positioning-status sensing element 106 is simultaneously moved or stopped with the punching knife 103. In a case that the punching knife 103 is stopped at the initial position, the positioning-status sensing element 106 is stayed at a specified position, which is referred as a return position 108. That is, in the initial status of the electric punch 100, the punching knife 103 is located at the initial position and the positioning-status sensing element 106 is located at the return position 108.

Hereinafter, an operation principle of the positioning-status sensing element 106 will be illustrated as follows. In the initial status of the electric punch 100, the punching knife 103 which is coupled to a terminal of the transmission cam 1022 is located at the initial position and the positioning-status sensing element 106 which is coupled to the other terminal of the transmission cam 1022 is located at the return position 108. After the motor 101 is started, the positioning-status sensing element 106 is moved from the return position 108 to the position-detecting light emitter 104. During movement of the positioning-status sensing element 106, the plurality of notches 107 successively pass through the region between the position-detecting light emitter 104 and the position-detecting light receiver 105. Consequently, the light beams penetrating these notches 107 are successively received by the position-detecting light receiver 105. After the punching operation is ended, the punching knife 103 is uplifted from the guide hole 113 to the initial position and thus the positioning-status sensing element 106 is moved to the return position 108. The speed of the motor 101 is reduced by referring to the notches 107 of the positioning-status sensing element 106. After the punching operation is completed, the positioning-status sensing element 106 is moved toward the return position 108. During movement of the positioning-status sensing element 106, the plurality of notches 107 successively pass through the region between the position-detecting light emitter 104 and the position-detecting light receiver 105. Consequently, the light beams penetrating these notches 107 are successively received by the position-detecting light receiver 105. According to the light-receiving status of the position-detecting light receiver 105, the speed of the motor 101 is gradually decreased such that the positioning-status sensing element 106 may be stopped at the return position 108.

Please refer to FIG. 1 again. The return light emitter 109 and the return light receiver 110 are slightly ahead of the return position 108 such that the positioning-status sensing element 106 can pass through the region between the return light emitter 109 and the return light receiver 110. The return light emitter 109 and the return light receiver 110 are helpful to recognize whether the positioning-status sensing element 106 is approaching the return position 108. In a case that the light beam emitted from the return light emitter 109 is not sheltered by the front end 1061 of the positioning-status sensing element 106 after the punching operation is completed, it is meant that the positioning-status sensing element 106 has not yet reached the return position 108. Whereas, in a case that the light beam emitted from the return light emitter 109 is sheltered by the front end 1061 of the positioning-status sensing element 106, it is meant that the positioning-status sensing element 106 is approaching the return position 108.

For each punching cycle, the positioning-status sensing element 106 will pass through the region between the position-detecting light emitter 104 and the position-detecting light receiver 105 for two times. If the motor 101 is braked and the speed thereof is lowered when the positioning-status sensing element 106 passes through the region between the position-detecting light emitter 104 and the position-detecting light receiver 105, it is impossible to perform the punching operation. On the one hand, the motor 101 is operated at the normal speed when the positioning-status sensing element 106 passes through the region between the position-detecting light emitter 104 and the position-detecting light receiver 105 for the first time. On the other hand, the motor 101 is operated at the reduced speed when the positioning-status sensing element 106 passes through the region between the position-detecting light emitter 104 and the position-detecting light receiver 105 for the second time.

The return light emitter 109 and the return light receiver 110 are helpful to control the speed of the motor. During the punching operation is performed, the positioning-status sensing element 106 is moved from the return position 108 to the position-detecting light emitter 104. At the moment when the front end 1061 of the positioning-status sensing element 106 leaves the region between the return light emitter 109 and the return light receiver 110, the light beam emitted from the return light emitter 109 is received by the return light receiver 110 and thus the punching operation is approaching. As a consequence, the motor 101 is operated at the normal speed when the return light receiver 110 is switched from the light-shielding status to the light-receiving status. That is, when the return light receiver 110 is operated in the light-receiving status and before the notches 107 have passed through the region between the position-detecting light emitter 104 and the position-detecting light receiver 105 for the first time, the motor 101 is operated at the normal speed. On the contrary, when the return light receiver 110 has continuously received the light beam for a certain period and when the notches 107 have passed through the region between the position-detecting light emitter 104 and the position-detecting light receiver 105, the punching operation is completed. Meanwhile, the motor 101 is ready to brake and enters the retarding stage.

In the initial status, the mechanical energy provided by the motor 101 is zero. During the operation of the electric punch 100, the motor 101 offers a working mechanical energy E to the transmission member 102. After the punching operation is completed, the mechanical energy provided by the motor 101 is reduced and finally to zero.

FIGS. 2(a), 2(b) and 2(c) are schematic diagrams illustrating operations of an exemplary positioning-status sensing element according to the present invention. As shown in FIGS. 2(a), 2(b) and 2(c), there are five notches between the front end 1061 and the rear end 1062 of the positioning-status sensing element 106. Starting from the front end 1061, these five notches of positioning-status sensing element 16 include a first notch 1071, a second notch 1072, a third notch 1073, a fourth notch 1074 and a fifth notch 1075. During the punching operation is performed, the positioning-status sensing element 106 is moved from the return position 108 to the position-detecting light emitter 104 and thus the light beams penetrating these notches 1071~1075 are successively received by the position-detecting light receiver 105. As previously described, the punching knife is synchronously moved with the positioning-status sensing element 106. After the punching operation is ended, the punching knife needs to go back to the initial position and thus the positioning-status sensing element 106 needs to be moved to the return position 108. Meanwhile, the front end 1061 of the positioning-status sensing element 106 enters the region between the position-detecting light emitter 104 and the position-detecting light receiver 105. Since the first light beam B1 is sheltered by the front end 1061 of the positioning-status sensing element 106, the first light beam B1 fails to be received by the position-detecting light receiver 105.

As the positioning-status sensing element 106 is continuously moved toward the return position 108, the first notch 1071 of the positioning-status sensing element 106 enters the region between the position-detecting light emitter 104 and the position-detecting light receiver 105. As shown in FIG. 2(a), the first light beam B1 is received by the position-detecting light receiver 105 again. In response to receipt of the first light beam B1, the speed of the motor 101 is reduced and thus the mechanical energy transferred to the transmission member 102 is decreased from the original magnitude E to a first mechanical energy E1. At this moment, the second light beam B2 emitted from the return light emitter 109, which is disposed in the vicinity of the return position 108, is continuously received by the a return light receiver 110. The receipt of the second light beam B2 indicates that the positioning-status sensing element 106 has not yet reached the region between the return light emitter 109 and the return light receiver 110. Next, as the positioning-status sensing element 106 is continuously moved toward the return position 108, the first light beam B1 is sheltered by the imperforate zone between the first notch 1071 and the second notch 1072. The transient change from the light-receiving status to the light-sheltering status of the position-detecting light receiver 105 indicates that first notch 1071 of the positioning-status sensing element 106 has just passed through the region between the position-detecting light emitter 104 and the position-detecting light receiver 105. Next, as the positioning-status sensing element 106 is continuously moved toward the return position 108, the second notch 1072 of the positioning-status sensing element 106 enters the region between the position-detecting light emitter 104 and the position-detecting light receiver 105 such that the first light beam B1 is received by the position-detecting light receiver 105 again. In response to receipt of the first light beam B1, the mechanical energy of the motor 101 is decreased to a second mechanical energy E2, wherein the second mechanical energy E2 is smaller than the first mechanical energy E1. Next, as the positioning-status sensing element 106 is continuously moved toward the return position 108, the first light beam B1 is sheltered by the imperforate zone between the second notch 1072 and the third notch 1073. The transient change from the light-receiving status to the light-sheltering status of the position-detecting light receiver 105 indicates that the second notch 1072 of the positioning-status sensing element 106 has just passed through the region between the position-detecting light emitter 104 and the position-detecting light receiver 105.

Next, as the positioning-status sensing element 106 is continuously moved toward the return position 108, the third notch 1073 of the positioning-status sensing element 106 enters the region between the position-detecting light emitter 104 and the position-detecting light receiver 105. As shown in FIG. 2(b), the first light beam B1 is received by the position-detecting light receiver 105 again. In response to receipt of the first light beam B1, the mechanical energy of the motor 101 is decreased to a third mechanical energy E3, wherein the third mechanical energy E3 is smaller than the second mechanical energy E2. Next, as the positioning-status sensing element 106 is continuously moved toward the return position 108, the first light beam B1 is sheltered by the imperforate zone between the third notch 1073 and the fourth notch 1074 such that the first light beam B1 fails to be received by the position-detecting light receiver 105. Next, as the positioning-status sensing element 106 is continuously moved toward the return position 108, the fourth notch 1074 of the positioning-status sensing element 106 enters the region between the position-detecting light emitter 104 and the position-detecting light receiver 105 and thus the first light beam B1 is received by the position-detecting light receiver 105 again. In response to receipt of the first light beam B1, the mechanical energy of the motor 101 is decreased to a fourth mechanical energy E4. Next, as the positioning-status sensing element 106 is continuously moved toward the return position 108, the first light beam B1 is sheltered by the imperforate zone between the fourth notch 1074 and the fifth notch 1075 such that the first light beam B1 fails to be received by the position-detecting light receiver 105. Next, as the positioning-status sensing element 106 is continuously moved toward the return position 108, the fifth notch 1075 of the positioning-status sensing element 106 enters the region between the position-detecting light emitter 104 and the position-detecting light receiver 105 and thus the first light beam B1 is received by the position-detecting light receiver 105 again. In response to receipt of the first light beam B1, the mechanical energy of the motor 101 is decreased to a fifth mechanical energy E5, wherein the fifth mechanical energy E5 is smaller than the fourth mechanical energy E4. The fifth mechanical energy E5 is sufficient to drive the transmission member 102 (as shown in FIG. 1) to move by a tiny shift. By the fifth mechanical energy E5, the front end 1061 of the positioning-status sensing element 106 is moved to the return position 108. After the fifth notch 1075 has passed through the region between the position-detecting light emitter 104 and the position-detecting light receiver 105 before the front end 1061 of the positioning-status sensing element 106 is moved to the return position 108, either the light-receiving status or the light-sheltering status of the position-detecting light receiver 105 is not critical to influence the motor brake.

Next, as the positioning-status sensing element 106 is continuously moved forwardly, the second light beam B2 emitted from the return light emitter 109 is sheltered by the front end 1061 of the positioning-status sensing element 106. Under this circumstance, the front end 1061 of the positioning-status sensing element 106 is approaching the return position 108. Until the fifth mechanical energy E5 is decreased to zero, the positioning-status sensing element 106 stays at the return position 108. The above control mechanisms may be implemented by a preset program installed in the electric punch.

As previously described, the return light emitter 109 and the return light receiver 110 are helpful to recognize whether the positioning-status sensing element 106 is approaching the return position 108 or whether the positioning-status sensing element 106 is moved toward the position-detecting light emitter 104. Moreover, in a case that the electric punch is jammed because punching knife is blunted or the documents are too thick, the use may turn off the electric punch and remove the jammed documents. After the electric punch is powered on again, the positioning-status sensing element 106 should go back to the return position 108 and the punching knife 113 should be moved to the initial position under the control of the built-in program. Since the movement of the positioning-status sensing element 106 is reciprocated for each punching cycle, the positioning-status sensing element 106 should be moved to the return position 108 before a new punching cycle is started. Once the second light beam B2 emitted from the return light emitter 109 is sheltered by the positioning-status sensing element 106, it is estimated that the positioning-status sensing element 106 has reached the return position 108.

In the initial status, the mechanical energy provided by the motor 101 is zero. During the operation of the electric punch 100, the motor 101 offers a working mechanical energy E to the transmission member 102. As the positioning-status sensing element 106 is moved toward the return position 108, the notches 1071~1075 of the positioning-status sensing element 106 successively pass through the region between the position-detecting light emitter 104 and the position-detecting light receiver 105. As a consequence, the mechanical energy of the motor 101 is gradually decreased to the first mechanical energy E1, the second mechanical energy E2, the third mechanical energy E3, the fourth mechanical energy and the fifth mechanical energy E5. In this embodiment, the mechanical energy of the motor 101 is gradually decreased, i.e. E5<E4<E3<E2<E1. It is noted that, however, those skilled in the art will readily observe that numerous modifications and alterations may be made while retaining the teachings of the invention. For example, the magnitudes of the mechanical energy E1~E5 are adjustable according to practical requirement or experiments as long as the working mechanical energy E is greater than the first mechanical energy E1 and the first mechanical energy E1 is greater than the fifth mechanical energy E5.

Figure 3:
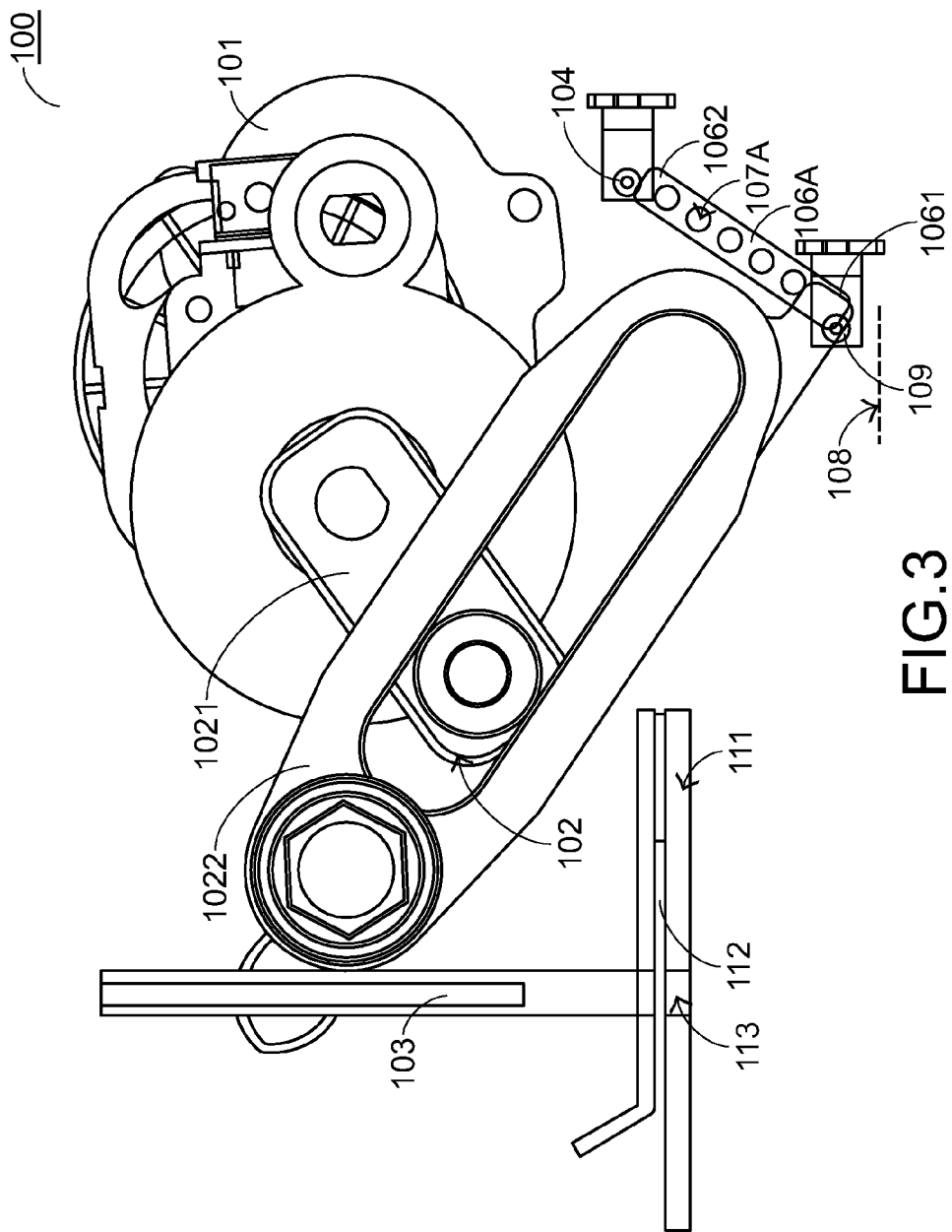
FIG. 3 is a schematic perspective view of a motor driving system for use with an electric punch according to a second preferred embodiment of the present invention.

A further embodiment of a motor driving system of the present invention is illustrated in FIG. 3. The operation principles and the configurations of the motor driving system is substantially identical to those of FIG. 1, and are not redundantly described herein. The motor driving system of FIG. 3 is distinguished by using openings to replace the notches. In the motor driving system of FIG. 1, the positioning-status sensing element 106 has a plurality of notches 107, which are open to one side of the positioning-status sensing element 106. In replace of the notches 107, the positioning-status sensing element 106A of the motor driving system of FIG. 3 has a plurality of opening 107A. In some instances, the positioning-status sensing element 106 is possibly deviated if the precisions of engaging associated components are insufficient. Since the notches 107 of FIG. 1 have relative higher light-transmission areas, the positioning-status sensing element 106 has a broader range of allowable error. Due to a narrower range of allowable error, if the positioning-status sensing element 106A of FIG. 3 is slightly deviated from the predetermined location, the first light beams will be no longer accurately penetrate through the openings 107A. Under this circumstance, the first light beams are partially or completely sheltered by the imperforate zones between openings 107A and thus fail to be received by the position-detecting light receiver 105. In comparison with FIG. 1, the positioning-status sensing element 106A of FIG. 3 has a narrower range of allowable error, but is more cost-effective.

In the above embodiments, the present invention is illustrated by referring to five notches or openings of the positioning-status sensing element. Nevertheless, the number of the notches or openings is not restricted. Generally, the positioning precision of the motor driving system is increased if the number of the notches or openings is increased. From the above description, the motor driving system of the present invention may provide high power output and high positioning precision. In other words, the present invention may be applied to the motors requiring high power output, for example DC motors, universal motors or synchronous motors. In addition, the present invention may be used for positioning induction motors without generation of an inrush current during the motor brake. Therefore, the present invention is capable of obviating the drawbacks encountered from the prior art While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A motor driving system for controlling movement of a follower member, said motor driving system comprising:
   a motor for providing a working mechanical energy E required to control movement of said follower member;
   a transmission member coupled to said motor and said follower member and driven by said motor to transmit said follower member to move;
   a position-detecting light emitter and a return light emitter for generating a first light beam and a second light beam, respectively;
   a position-detecting light receiver and a return light receiver for receiving said first light beam and said second light beam, respectively; and
   a positioning-status sensing element disposed on said transmission member and including a front end, a rear end and a plurality of notches or openings between said first end and said rear end, said positioning-status sensing element being moved between said position-detecting light emitter and said position-detecting light receiver such that a light beam emitted from said position-detecting light emitter is successively penetrated through said notches or openings to be received by said position-detecting light receiver, wherein said working mechanical energy E provided by said motor is decreased to a first mechanical energy E1 so as to reduce the speed of said transmission member when the notch or opening nearest to said front end of said positioning-status sensing element enters the region between said position-detecting light emitter and said position-detecting light receiver, and said working mechanical energy E provided by said motor is decreased to a final mechanical energy En when the notch or opening nearest to said rear end of said positioning-status sensing element enters the region between said position-detecting light emitter and said position-detecting light receiver, where said first mechanical energy E1 is greater than said final mechanical energy En.

2. The motor driving system according to claim 1 wherein said motor is a universal motor, a DC motor, a synchronous motor or an induction motor.

3. The motor driving system according to claim 1 wherein said follower member is a punching knife.

* * * * *